US012456821B2

(12) United States Patent
Seo et al.

(10) Patent No.: US 12,456,821 B2
(45) Date of Patent: Oct. 28, 2025

(54) RADAR ANTENNA

(71) Applicant: AMOSENSE CO., LTD., Cheonan-si (KR)

(72) Inventors: Yunsik Seo, Cheonan-si (KR); Hongdae Jung, Cheonan-si (KR); Jiwoong Jeong, Cheonan-si (KR); Seho Lee, Cheonan-si (KR); Hyungil Baek, Cheonan-si (KR); Hyunjoo Park, Cheonan-si (KR); Hanju Do, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 135 days.

(21) Appl. No.: 18/285,376

(22) PCT Filed: Apr. 27, 2022

(86) PCT No.: PCT/KR2022/006046
§ 371 (c)(1),
(2) Date: Oct. 25, 2023

(87) PCT Pub. No.: WO2022/231315
PCT Pub. Date: Nov. 3, 2022

(65) Prior Publication Data

US 2024/0186722 A1 Jun. 6, 2024

(30) Foreign Application Priority Data

Apr. 28, 2021 (KR) ........................ 10-2021-0055157

(51) Int. Cl.
*H01Q 21/00* (2006.01)
*H01Q 1/32* (2006.01)
*H01Q 1/52* (2006.01)

(52) U.S. Cl.
CPC ....... *H01Q 21/0025* (2013.01); *H01Q 1/3233* (2013.01); *H01Q 1/523* (2013.01); *H01Q 21/005* (2013.01)

(58) Field of Classification Search
CPC ........ H01Q 1/3233; H01Q 1/52; H01Q 1/521; H01Q 1/523; H01Q 21/0025;
(Continued)

(56) References Cited

U.S. PATENT DOCUMENTS 8,098,207 B1 1/2012 Herting et al.
2008/0074324 A1 3/2008 Puzella et al.
(Continued)

FOREIGN PATENT DOCUMENTS

EP 2 070 159 B1 12/2010
EP 2 889 960 A1 7/2015
(Continued)

OTHER PUBLICATIONS

KR Office Action dated Aug. 10, 2023 as received in Application No. 10-2021-0055157.
(Continued)

*Primary Examiner* — Robert Karacsony
(74) *Attorney, Agent, or Firm* — Maschoff Brennan

(57) ABSTRACT

Proposed is a radar antenna to which detachable modules including one or more antennas are coupled. The proposed radar antenna comprises: a first detachable module in which one or more antennas are formed; and a second detachable module in which one or more antennas are formed, wherein a first side surface of the second detachable module is bonded to a first side surface of the first detachable module.

8 Claims, 10 Drawing Sheets

(58) Field of Classification Search
CPC ........... H01Q 21/0037; H01Q 21/0043; H01Q 21/005; H01Q 21/0087; H01Q 13/0233; H01P 11/00; H01P 11/001; H01P 11/002
See application file for complete search history.

(56) References Cited

U.S. PATENT DOCUMENTS

| | | | | |
|---|---|---|---|---|
| 2015/0229027 | A1* | 8/2015 | Sonozaki | ............. H01Q 21/005 343/771 |
| 2022/0231423 | A1 | 7/2022 | Park et al. | |

FOREIGN PATENT DOCUMENTS

| | | | |
|---|---|---|---|
| JP | H05-6921 | U | 1/1993 |
| JP | 2010-507929 | A | 3/2010 |
| KR | 10-1461129 | B1 | 11/2014 |
| KR | 10-2015-0046024 | A | 4/2015 |
| KR | 10-2020-0092615 | A | 8/2020 |
| KR | 10-2020-0137166 | A | 12/2020 |

OTHER PUBLICATIONS

Extended European Search Report dated Sep. 12, 2024 as received in Application No. 22796147.1.

* cited by examiner

[FIG. 1]
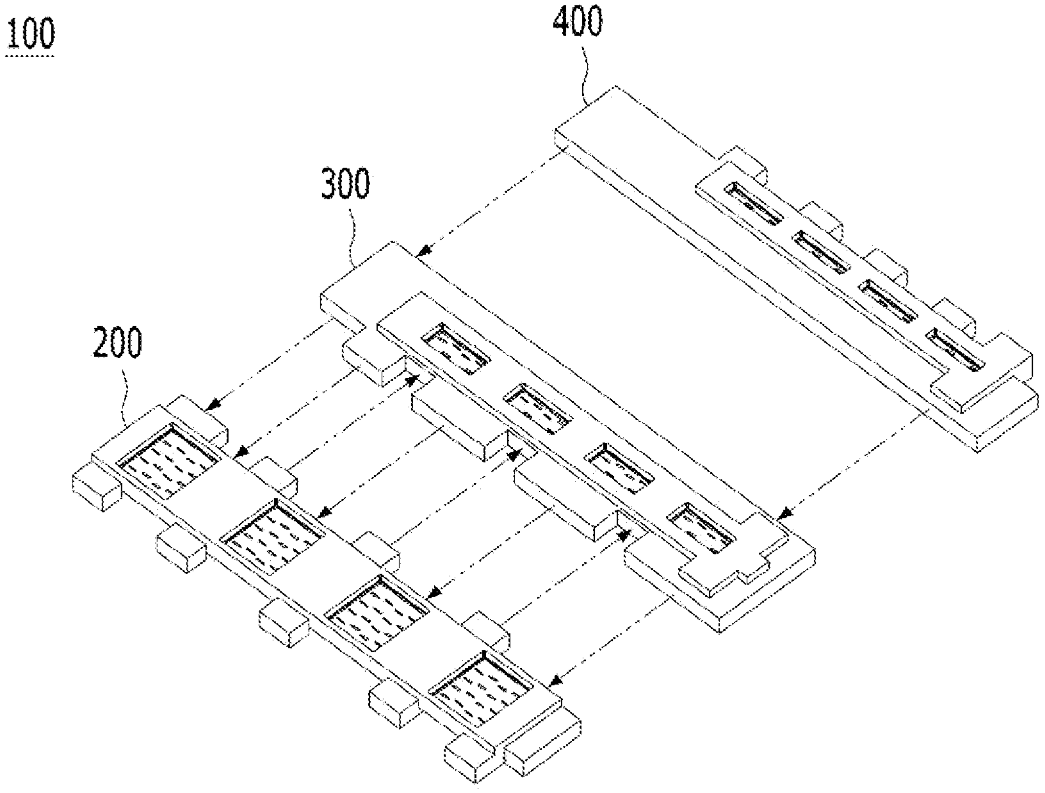

[FIG. 2]
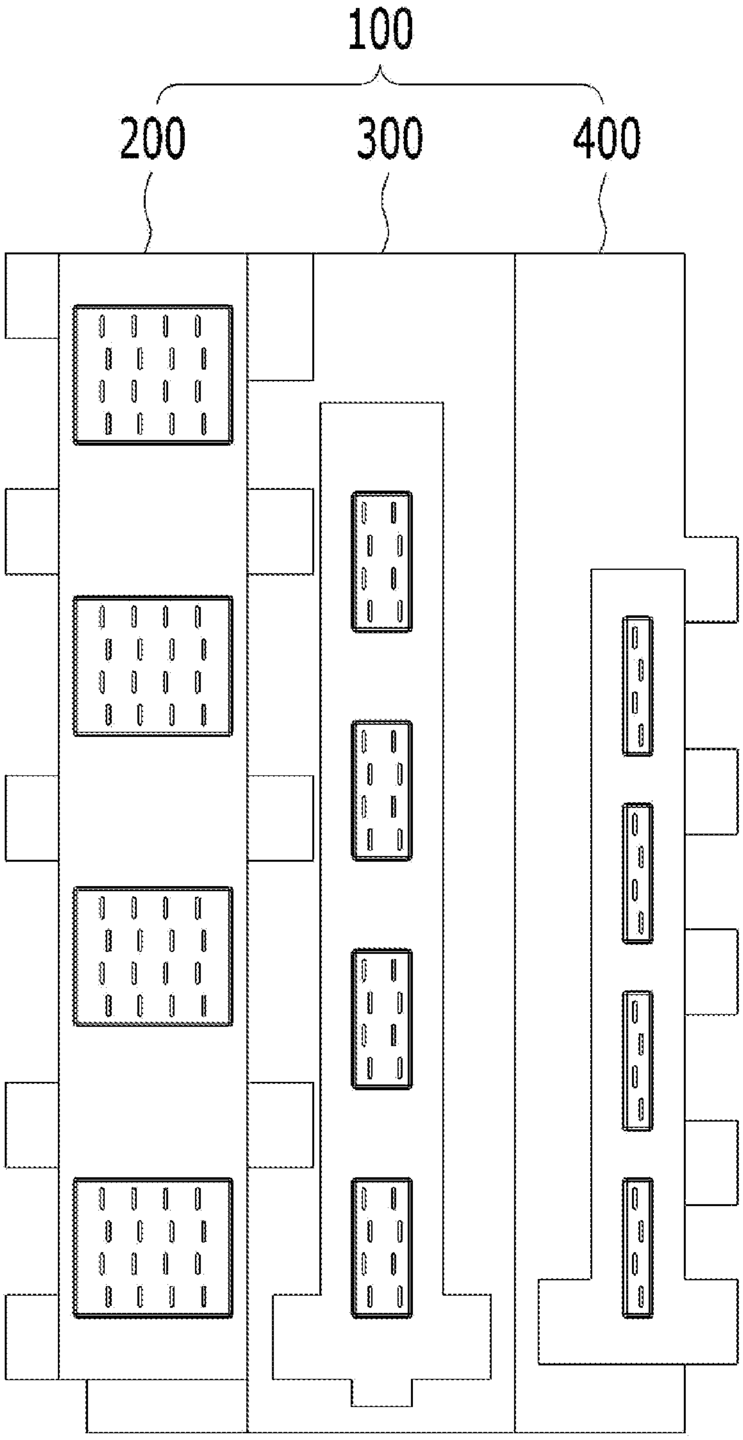

[FIG. 3]
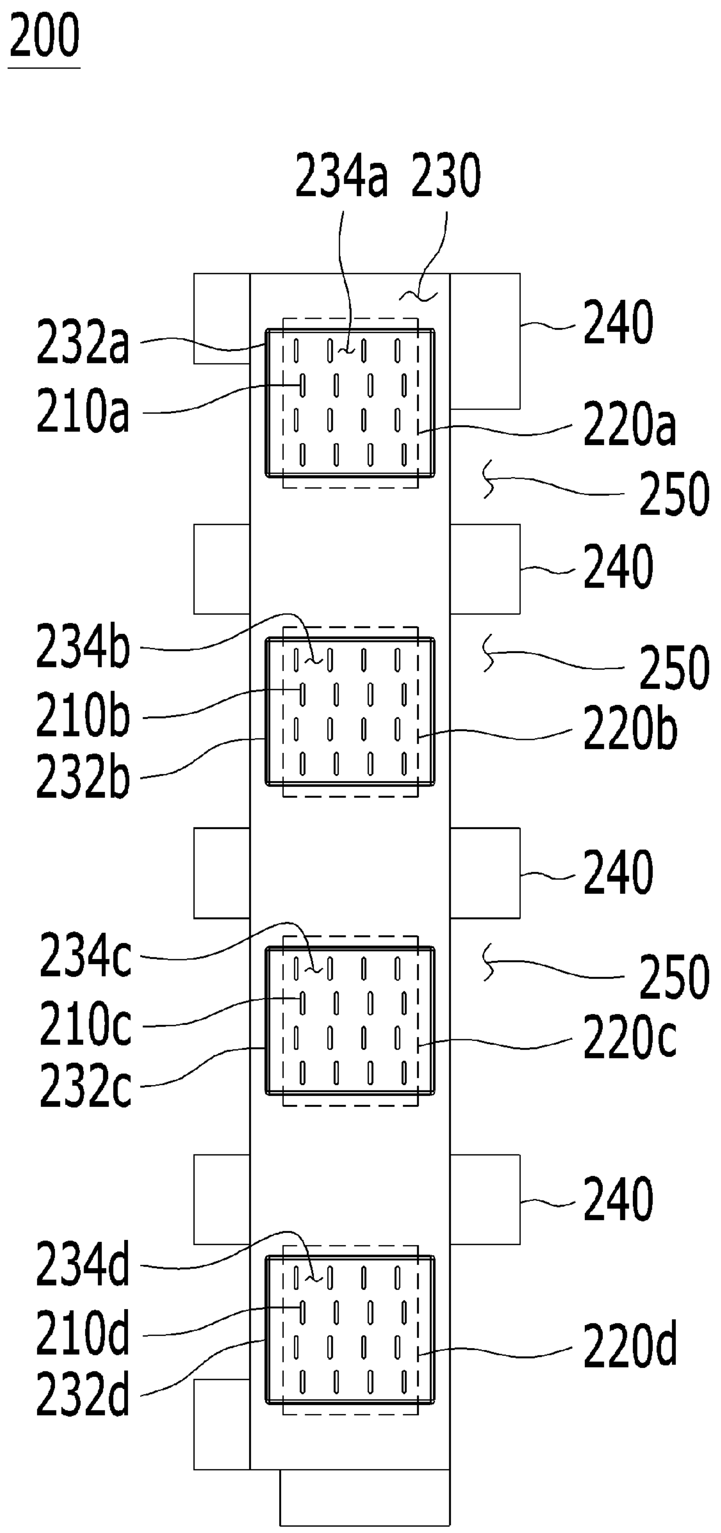

[FIG. 4]
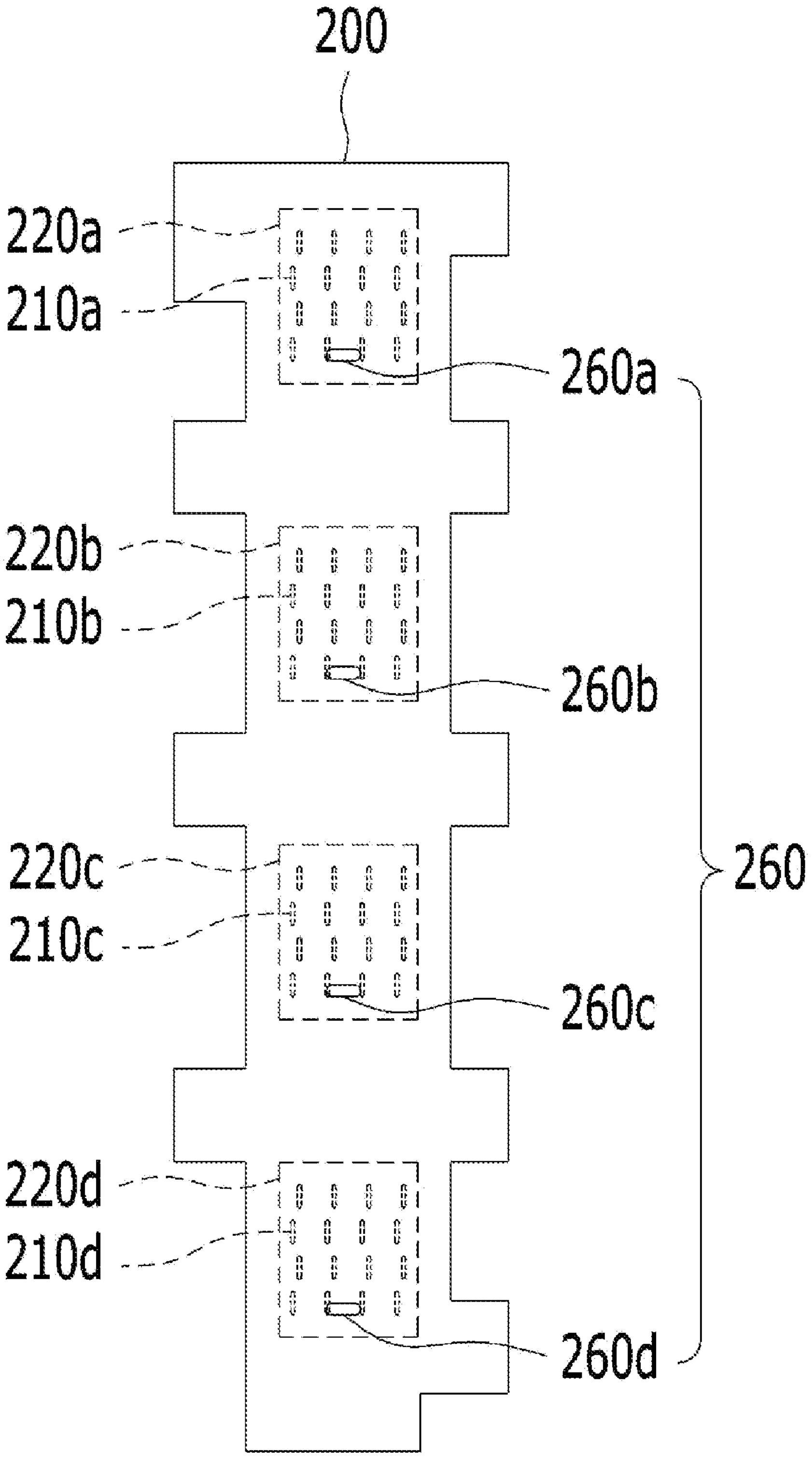

[FIG. 5]
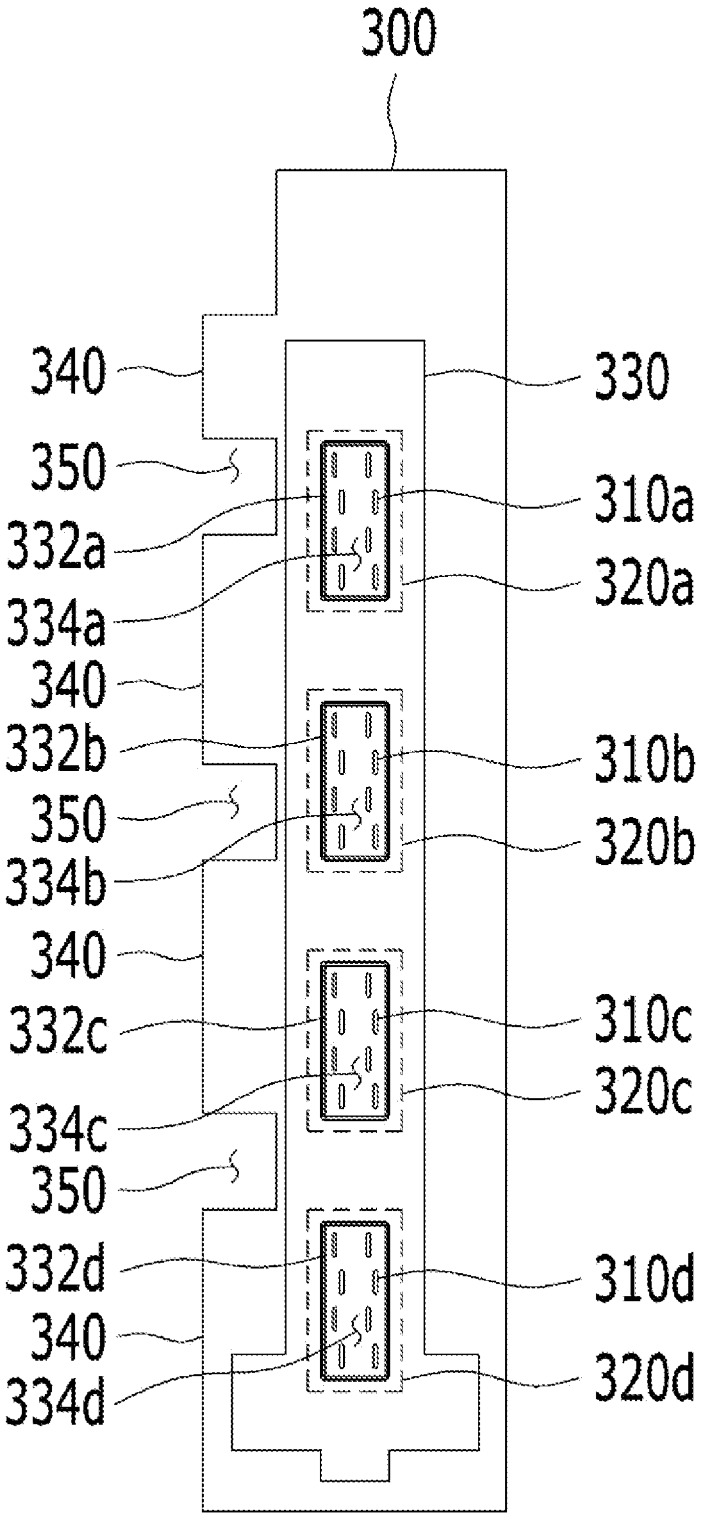

[FIG. 6]
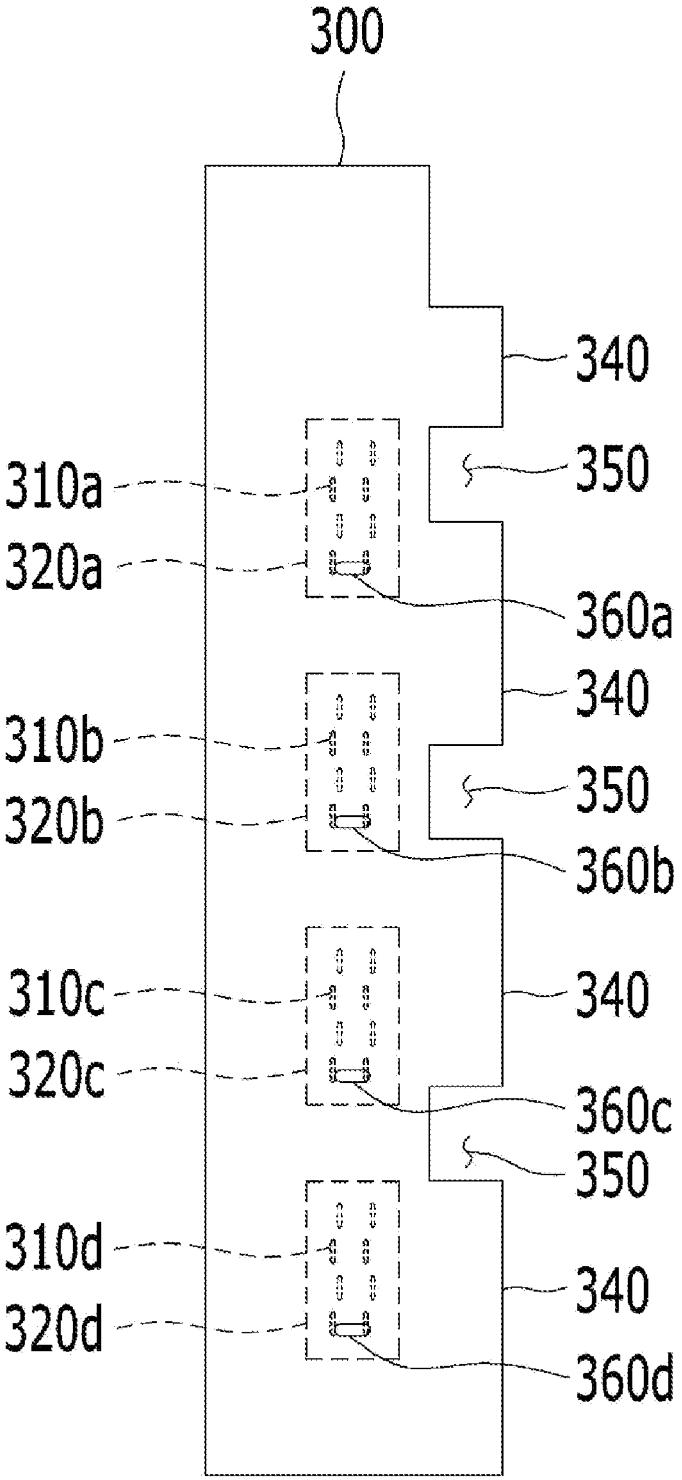

[FIG. 7]
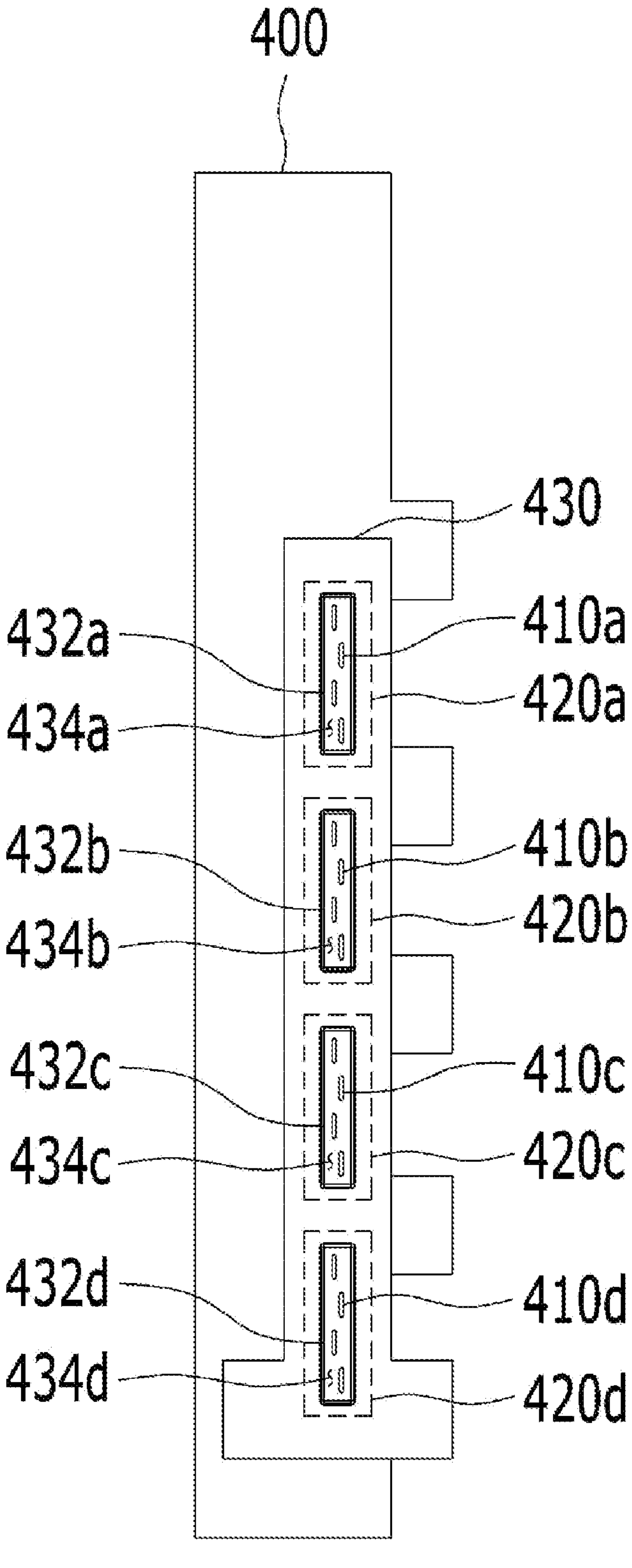

[FIG. 8]
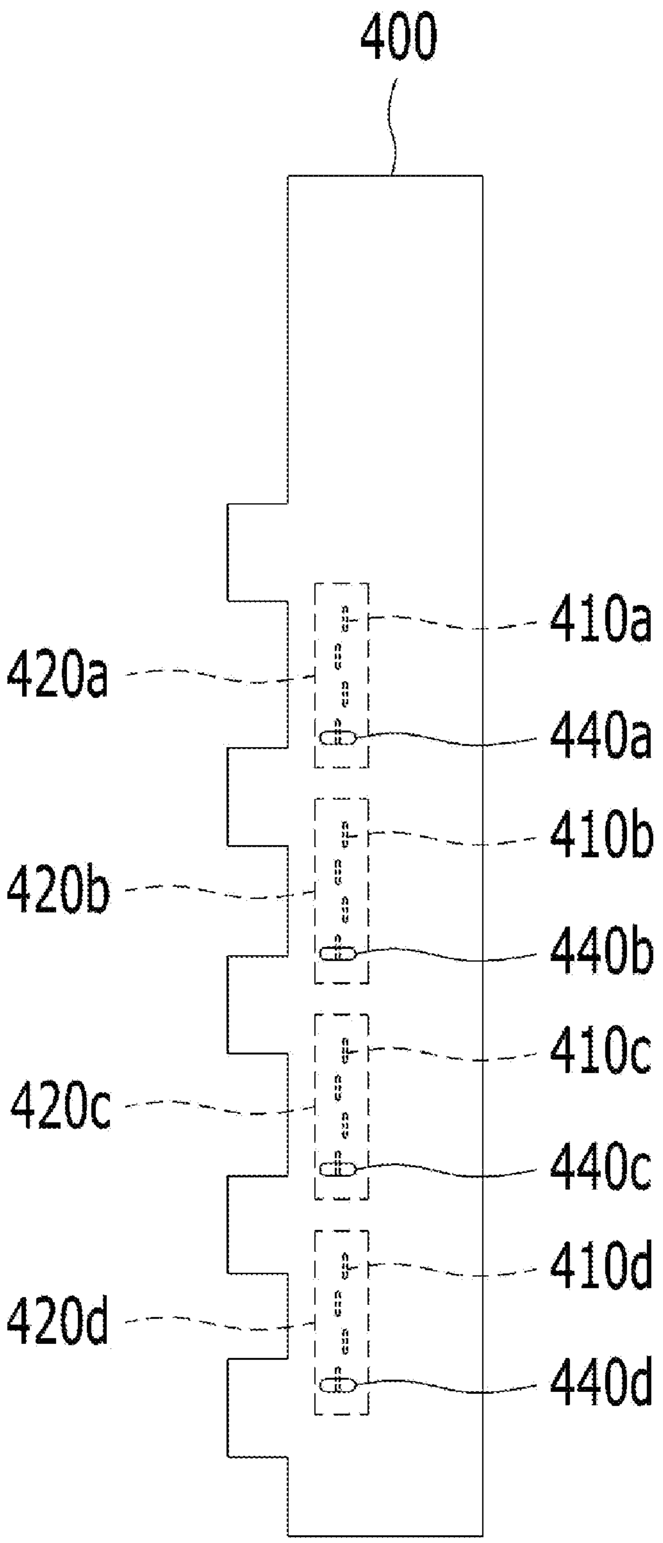

[FIG. 9]
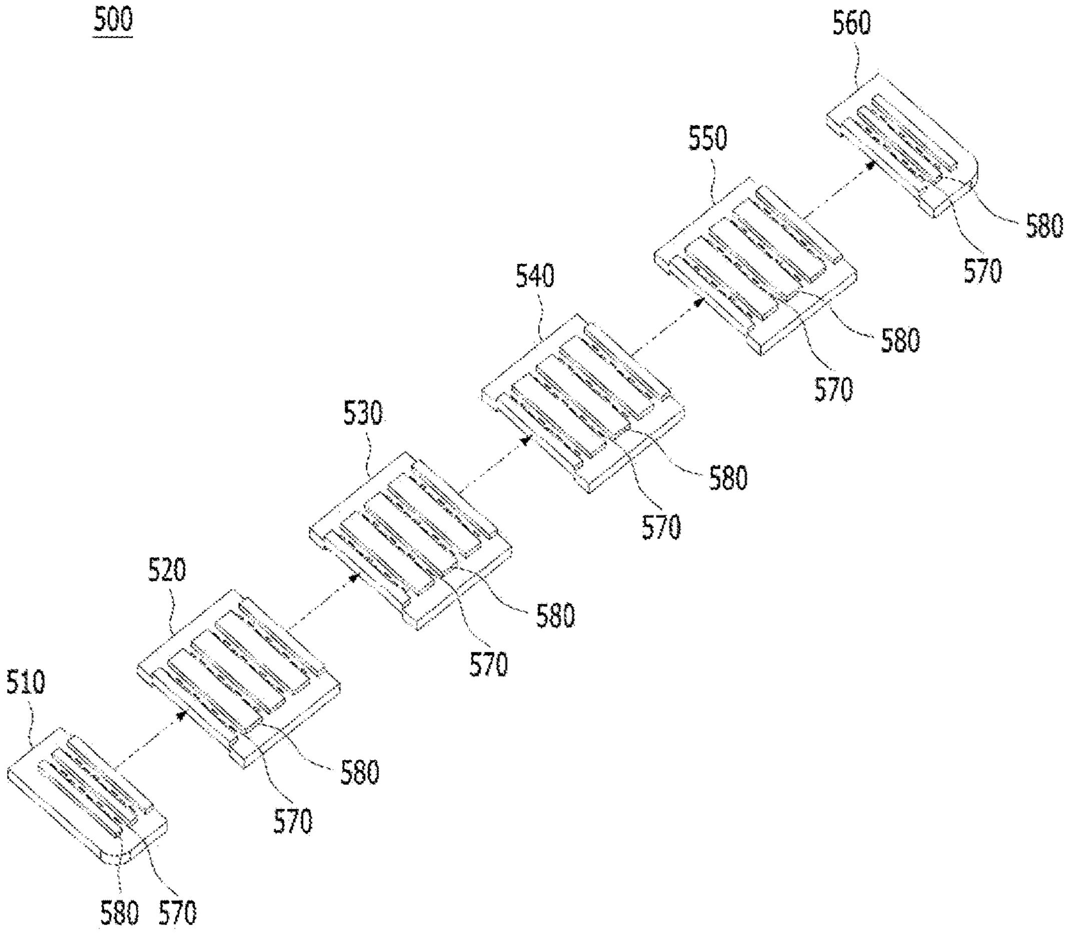

[FIG. 10]
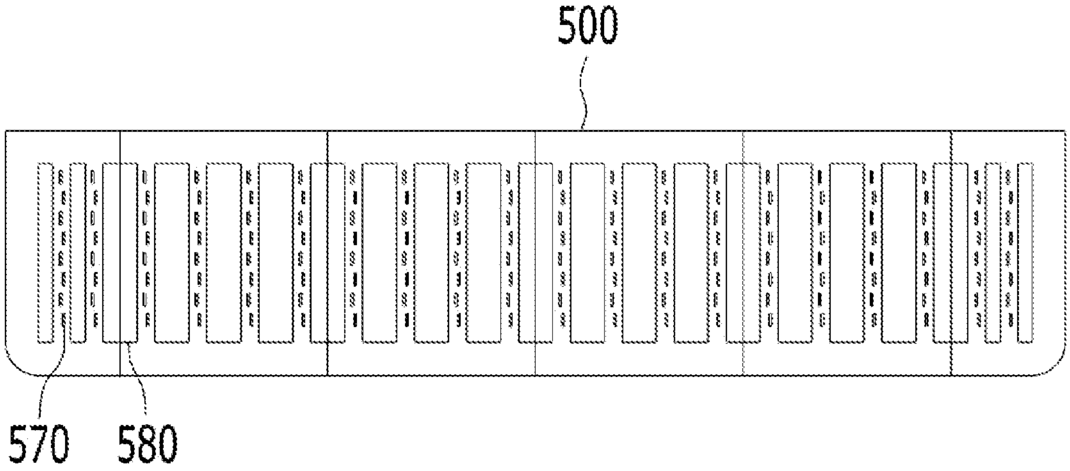

RADAR ANTENNA

TECHNICAL FIELD

The present disclosure relates to an antenna, and more particularly, to a radar antenna.

BACKGROUND ART

It is on trend to use a radar antenna for signal transmission and reception for detecting an object around a vehicle. The radar antenna radiates radio waves onto an object, and makes it possible to detect the existence/nonexistence, distance, movement direction, movement speed, identification, and classification of the object by means of reflected waves or scattered waves having bounced off the object.

Recently, for an advancement of anti-collision radar of an autonomous vehicle to cope with a driverless vehicle era, technologies to widen the detection range and to heighten the performance of such a radar antenna have been researched.

The above matter described as a background technology is to help understanding of the background of the present disclosure, and may include the matter that is not the technology in the related art already known to those of ordinary skill in the art to which the present disclosure pertains.

SUMMARY OF INVENTION

Technical Problem

The present disclosure has been proposed in consideration of the above situation, and an object of the present disclosure is to provide a radar antenna to which detachable modules including one or more antennas are coupled.

Solution to Problem

In order to achieve the above object, a radar antenna according to an embodiment of the present disclosure includes: a first detachable module formed with one or more antennas; and a second detachable module formed with one or more antennas, and having a first side surface bonded onto a first side surface of the first detachable module.

A plurality of first coupling protrusions may be disposed to be spaced apart from one another on the first side surface of the first detachable module, a first coupling groove may be formed between the two adjacent first coupling protrusions, and the first coupling protrusions and the first coupling grooves may be alternately disposed on the first side surface of the first detachable module. In this case, the first detachable module may include: a plurality of first slits formed on a first surface of the first detachable module and forming one or more first slit groups; a plurality of second slits formed on a second surface of the first detachable module that faces the first surface of the first detachable module; and one or more first waveguides formed inside the first detachable module, and forming an antenna through communicating with the first slit group and the first slit.

A plurality of second coupling protrusions may be disposed to be spaced apart from one another on the first side surface of the second detachable module, and a second coupling groove may be formed between the two adjacent second coupling protrusions. In this case, the second coupling protrusion may be inserted into the first coupling groove of the first detachable module, and the first coupling protrusion of the first detachable module may be inserted into the second coupling groove. Here, the second detachable module may include: a plurality of third slits formed on a first surface of the second detachable module and forming one or more third slit groups; a plurality of fourth slits formed on a second surface of the second detachable module that faces the first surface of the second detachable module; and one or more second waveguides formed inside the second detachable module, and forming an antenna through communicating with the third slit group and the fourth slit.

The radar antenna according to an embodiment of the present disclosure may further include a third detachable module formed with one or more antennas, and bonded onto a second side surface of the second detachable module having a first side surface that faces the first side surface of the second detachable module.

Advantageous Effects of Invention

According to the present disclosure, since the radar antenna is constituted by coupling the detachable modules including one or more antennas, it can be manufactured by combining the detachable modules in accordance with the communication performance (specification) demanded by a consumer, and beam tilting or beam width of the radar antenna can be produced to suit their purposes.

Further, since the radar antenna is constituted by coupling the detachable modules including one or more antennas, only the defective or faulty detachable module can be replaced, and thus the cost for the maintenance and repair can be minimized.

Further, since the radar antenna is constituted by coupling the detachable modules including one or more antennas, only the defective or faulty detachable module can be replaced, and thus it is possible to flexibly respond to the occurrence of the defect or malfunction.

Further, since the radar antenna is constituted by coupling the detachable modules including one or more antennas, only the defective or faulty detachable module can be replaced, and thus the manufacturing yield can be improved while reducing the manufacturing cost.

BRIEF DESCRIPTION OF DRAWINGS

FIGS. 1 and 2 are views explaining a radar antenna (i.e., radar antenna for transmission) according to an embodiment of the present disclosure.

FIG. 3 is a top view explaining a first detachable module of FIG. 1.

FIG. 4 is a bottom view explaining a first detachable module of FIG. 1.

FIG. 5 is a top view explaining a second detachable module of FIG. 1.

FIG. 6 is a bottom view explaining a second detachable module of FIG. 1.

FIG. 7 is a top view explaining a third detachable module of FIG. 1.

FIG. 8 is a bottom view explaining a third detachable module of FIG. 1.

FIGS. 9 and 10 are views explaining a modified example of a radar antenna (i.e., radar antenna for reception) according to an embodiment of the present disclosure.

DESCRIPTION OF EMBODIMENTS

For detailed explanation to the extent that those of ordinary skill in the art to which the present disclosure pertains can easily embody the technical idea of the present disclosure, the most preferred embodiment of the present disclosure will be described with reference to the accompanying drawings. First, in giving reference numerals to constituent elements of the respective drawings, it is to be noted that the same constituent elements have possibly the same reference numerals although they are denoted in different drawings. Further, in describing the present disclosure, detailed explanation of related known constitutions or functions will be omitted in case that such detailed explanation may obscure the subject matter of the present disclosure.

Referring to FIGS. 1 and 2, a radar antenna 100 according to an embodiment of the present disclosure is a radar antenna 100 for transmission, and is configured to include a first detachable module 200, a second detachable module 300, and a third detachable module 400.

In order to secure reliability and stability of the final product (i.e., radar antenna 100 for transmission), the radar antenna 100 is bonded and fixed in a state where the second detachable module 300 is interposed between the first detachable module 200 and the third detachable module 400. In this case, as an example, the first detachable module 200 to the third detachable module 400 are disposed on the same plane, are bonded along the circumference of the contact surfaces, and are bonded and fixed through processes, such as ultrasonic fusion and the like.

Here, FIGS. 1 and 2 illustrate that the radar antenna 100 is composed of the first detachable module 200 to the third detachable module 400, and in accordance with the required specification and environment, the radar antenna 100 may be composed of two detachable modules, or four or more detachable modules.

Each of the first detachable module 200 to the third detachable module 400 includes one or more antennas. Here, as an example, the antenna is an antenna composed of a plurality of slits.

Referring to FIG. 3, the first detachable module 200 is formed in the shape of a flat plate having a predetermined thickness. As an example, the first detachable module 200 is a plate-shaped ceramic substrate having a first surface and a second surface facing the first surface.

A plurality of first slits 210 are formed on the first surface of the first detachable module 200. The plurality of first slits 210 formed on the first surface of the first detachable module 200 are divided into one or more groups of the first slits 210. As an example, on the first surface of the first detachable module 200, a plurality of the (1-1)-th slits **210*a* constituting the (1-1)-th slit group 220*a*, a plurality of the (1-2)-th slits 210*b* constituting the (1-2)-th slit group 220*b*, a plurality of the (1-3)-th slits 210*c* constituting the (1-3)-th slit group 220*c*, and a plurality of the (1-4)-th slits 210*d* constituting the (1-4)-th slit group 220*d* are formed. The (1-1)-th slit group 220*a* to the (1-4)-th slit group 220*d*** are disposed to be spaced apart from one another.

Referring to FIG. 4, on the second surface of the first detachable module 200, a plurality of second slits 260 constituting the antenna together with the plurality of first slits 210 are formed. The plurality of second slits 260 are connected one-to-one to the group of the plurality of the first slits 210 through a waveguide (not illustrated) to constitute a plurality of first antennas. Here, the waveguide (not illustrated) is a path disposed inside the first detachable module 200 to connect the group of the first slits 210 and the second slit 260 to each other.

As an example, on the second surface of the first detachable module 200, the (2-1)-th slit **260*a* connected to the (1-1)-th slit group 220*a* through the (1-1)-th waveguide (not illustrated) to constitute the first antenna, the (2-2)-th slit 260*b* connected to the (1-2)-th slit group 220*b* through the (1-2)-th waveguide (not illustrated) to constitute the second antenna, the (2-3)-th slit 260*c* connected to the (1-3)-th slit group 220*c* through the (1-3)-th waveguide (not illustrated) to constitute the third antenna, and the (2-4)-th slit 260*d* connected to the (1-4)-th slit group 220*d*** through the (1-4)-th waveguide (not illustrated) to constitute the fourth antenna are formed.

Here, although FIGS. 3 and 4 illustrate that four antennas (i.e., first to fourth antennas) are formed on the first detachable module 200, the number of antennas is not limited thereto, and three or less antennas may be formed, or five or more antennas may be formed.

On the first surface of the first detachable module 200, a first shield block 230 may be formed. On the first shield block 230, a plurality of first accommodation holes 232 for respectively accommodating the plurality of slit groups are formed. In this case, in the first shield block 230, a first shield space 234 is defined by an inner wall of the first accommodation hole 232 and the first surface of the first detachable module 200, and the first slit 210 is accommodated in the first shield space 234, and is shielded from another adjacent group of the first slits 210. As an example, on the first shield block 230, the (1-1)-th accommodation hole **232*a* accommodating the (1-1)-th slit group 220*a* and forming the (1-1)-th shield space 234*a*, the (1-2)-th accommodation hole 232*b* accommodating the (1-2)-th slit group 220*b* and forming the (1-2)-th shield space 234*b*, the (1-3)-th accommodation hole 232*c* accommodating the (1-3)-th slit group 220*c* and forming the (1-3)-th shield space 234*c*, and the (1-4)-th accommodation hole 232*d* accommodating the (1-4)-th slit group 220*d* and forming the (1-4)-th shield space 234*d*** are formed.

On the first side surface of the first detachable module 200, a plurality of first coupling protrusions 240 for guiding coupling to the second detachable module 300 and temporarily fixing the first detachable module 200 and the second detachable module 300 before a bonding process may be formed. The plurality of first coupling protrusions 240 are formed on the first side surface that is coupled to the first detachable module 200 among side surfaces of the first detachable module 200. The plurality of first coupling protrusions 240 are disposed to be spaced apart from each other at predetermined intervals. Accordingly, a first coupling groove 250 is formed between the two adjacent first coupling protrusions 240, and the first coupling protrusion 240 and the first coupling groove 250 are alternately disposed on the first side surface of the first detachable module 200.

Referring to FIG. 5, the second detachable module 300 is formed in the shape of a flat plate having a predetermined thickness. As an example, the second detachable module 300 is a plate-shaped ceramic substrate having a first surface and a second surface facing the first surface.

A plurality of third slits 310 are formed on the first surface of the second detachable module 300. The plurality of third slits 310 formed on the first surface of the second detachable module 300 are divided into one or more third slit groups 320. As an example, on the first surface of the second detachable module 300, a plurality of the (3-1)-th slits **310*a* constituting the (3-1)-th slit group 320*a*, a plurality of the (3-2)-th slits 310*b* constituting the (3-2)-th slit group 320*b*, a plurality of the (3-3)-th slits 310*c* constituting the (3-3)-th slit group 320*c*, and a plurality of the (3-4)-th slits 310*d* constituting the (3-4)-th slit group 320*d* are formed. The (3-1)-the slit group 320***a* to the (3-4)-th slit group 320*d* are disposed to be spaced apart from one another.

Referring to FIG. 6, on the second surface of the second detachable module 300, a plurality of fourth slits 360 constituting the antenna together with the plurality of third slits 310 are formed. The plurality of fourth slits 360 are connected one-to-one to the plurality of third slit groups 320 through a waveguide (not illustrated) to constitute a plurality of second antennas. Here, the waveguide (not illustrated) is a path disposed inside the second detachable module 300 to connect the third slit group 320 and the fourth slit 360 to each other.

As an example, on the second surface of the second detachable module 300, the (4-1)-th slit 360*a* connected to the (3-1)-th slit group 320*a* through the (2-1)-th waveguide (not illustrated) to constitute the fifth antenna, the (4-2)-th slit 360*b* connected to the (3-2)-th slit group 320*b* through the (2-2)-th waveguide (not illustrated) to constitute the sixth antenna, the (4-3)-th slit 360*c* connected to the (3-3)-th slit group 320*c* through the (2-3)-th waveguide (not illustrated) to constitute the seventh antenna, and the (4-4)-th slit 360*d* connected to the (3-4)-th slit group 320*d* through the (2-4)-th waveguide (not illustrated) to constitute the eighth antenna are formed.

Here, although FIGS. 5 and 6 illustrate that four antennas (i.e., fifth to eighth antennas) are formed on the second detachable module 300, the number of antennas is not limited thereto, and three or less antennas may be formed, or five or more antennas may be formed.

On the first surface of the second detachable module 300, a second shield block 330 may be formed. On the second shield block 330, a plurality of second accommodation holes 332 for respectively accommodating the plurality of third slit groups 320 are formed. In this case, in the second shield block 330, a second shield space 334 is defined by an inner wall of the second accommodation hole 332 and the first surface of the second detachable module 300, and the third slit group 320 is accommodated in the second shield space 334, and is shielded from another adjacent third slit group 320. As an example, on the second shield block 330, the (2-1)-th accommodation hole 332*a* accommodating the (3-1)-th slit group 320*a* and forming the (2-1)-th shield space 334*a*, the (2-2)-th accommodation hole 332*b* accommodating the (3-2)-th slit group 320*b* and forming the (2-2)-th shield space 334*b*, the (2-3)-th accommodation hole 332*c* accommodating the (3-3)-th slit group 320*c* and forming the (2-3)-th shield space 334*c*, and the (2-4)-th accommodation hole 332*d* accommodating the (3-4)-th slit group 320*d* and forming the (2-4)-th shield space 334*d* are formed.

On the first side surface of the second detachable module 300, a plurality of second coupling protrusions 340 for guiding coupling to the first detachable module 200 and temporarily fixing the first detachable module 200 and the second detachable module 300 before a bonding process may be formed. The plurality of second coupling protrusions 340 are formed on the first side surface that is coupled to the first detachable module 200 among side surfaces of the second detachable module 300. The plurality of second coupling protrusions 340 are disposed to be spaced apart from each other at predetermined intervals. Accordingly, a second coupling groove 350 is formed between the two adjacent second coupling protrusions 340, and the second coupling protrusion 340 and the second coupling groove 350 are alternately disposed on the first side surface of the second detachable module 300.

When the first detachable module 200 and the second detachable module 300 are coupled to each other, the second coupling protrusion 340 of the second detachable module 300 is inserted into the first coupling groove 250 of the first detachable module 200, and the first coupling protrusion 240 of the first detachable module 200 is inserted into the second coupling groove 350 of the second detachable module 300.

Meanwhile, although not illustrated in FIGS. 5 and 6, on the second side surface of the second detachable module 300, a plurality of third coupling protrusions (not illustrated) configured to guide the coupling to the third detachable module 400 and to temporarily fix the second detachable module 300 and the third detachable module 400 before the bonding process may be further formed. The plurality of third coupling protrusions (not illustrated) are formed on the second side surface that is coupled to the third detachable module 400 among side surfaces of the second detachable module 300. The plurality of third coupling protrusions (not illustrated) are disposed to be spaced apart from one another at predetermined intervals. Accordingly, between the two adjacent third coupling protrusions (not illustrated), a third coupling groove (not illustrated) is formed. Here, the second side surface of the second detachable module 300 is a side surface that faces the first side surface.

Referring to FIG. 7, the third detachable module 400 is formed in the shape of a flat plate having a predetermined thickness. As an example, the third detachable module 400 is a plate-shaped ceramic substrate having a first surface and a second surface facing the first surface.

A plurality of fifth slits 410 are formed on the first surface of the third detachable module 400. The plurality of fifth slits 410 formed on the first surface of the third detachable module 400 are divided into one or more fifth slit groups 420. As an example, on the first surface of the third detachable module 400, a plurality of the (5-1)-th slits 410*a* constituting the (5-1)-th slit group 420*a*, a plurality of the (5-2)-th slits 410*b* constituting the (5-2)-th slit group 420*b*, a plurality of the (5-3)-th slits 410*c* constituting the (5-3)-th slit group 420*c*, and a plurality of the (5-4)-th slits 410*d* constituting the (5-4)-th slit group 420*d* are formed. The (5-1)-the slit group 420*a* to the (5-4)-th slit group 420*d* are disposed to be spaced apart from one another.

Referring to FIG. 8, on the second surface of the third detachable module 400, a plurality of sixth slits 440 constituting the antenna together with the plurality of fifth slits 410 are formed. The plurality of sixth slits 410 are connected one-to-one to the plurality of fifth slit groups 420 through a waveguide (not illustrated) to constitute a plurality of third antennas. Here, the waveguide (not illustrated) is a path disposed inside the third detachable module 400 to connect the fifth slit group 420 and the sixth slit 440 to each other.

As an example, on the second surface of the third detachable module 400, the (6-1)-th slit 440 connected to the (5-1)-th slit group 420*a* through the (3-1)-th waveguide (not illustrated) to constitute the ninth antenna, the (6-2)-th slit 440*b* connected to the (5-2)-th slit group 420*b* through the (3-2)-th waveguide (not illustrated) to constitute the tenth antenna, the (6-3)-th slit 440*c* connected to the (5-3)-th slit group 420*c* through the (3-3)-th waveguide (not illustrated) to constitute the eleventh antenna, and the (6-4)-th slit 440*d* connected to the (5-4)-th slit group 420*d* through the (3-4)-th waveguide (not illustrated) to constitute the twelfth antenna are formed.

Here, although FIGS. 7 and 8 illustrate that four antennas (i.e., ninth to twelfth antennas) are formed on the third detachable module 400, the number of antennas is not limited thereto, and three or less antennas may be formed, or five or more antennas may be formed.

On the first surface of the third detachable module 400, a third shield block 430 may be formed. On the third shield block 430, a plurality of third accommodation holes 432 for respectively accommodating the plurality of fifth slit groups 420 are formed. In this case, in the third shield block 430, a third shield space 434 is defined by an inner wall of the third accommodation hole 432 and the first surface of the third detachable module 400, and the fifth slit group 420 is accommodated in the third shield space 434, and is shielded from another adjacent fifth slit group 420.

As an example, on the third shield block 430, the (3-1)-th accommodation hole 432*a* accommodating the (5-1)-th slit group 420*a* and forming the (3-1)-th shield space 434*a*, the (3-2)-th accommodation hole 432*b* accommodating the (5-2)-th slit group 420*b* and forming the (3-2)-th shield space 434*b*, the (3-3)-th accommodation hole 432*c* accommodating the (5-3)-th slit group 420*c* and forming the (3-3)-th shield space 434*c*, and the (3-4)-th accommodation hole 432*d* accommodating the (5-4)-th slit group 420*d* and forming the (3-4)-th shield space 434*d* are formed.

Meanwhile, although not illustrated in FIGS. 7 and 8, on the first side surface of the third detachable module 400, a plurality of fourth coupling protrusions (not illustrated) configured to guide the coupling to the second detachable module 300 and to temporarily fix the second detachable module 300 and the third detachable module 400 before the bonding process may be formed. The plurality of fourth coupling protrusions (not illustrated) are formed on the first side surface that is coupled to the second detachable module 300 among side surfaces of the third detachable module 400. The plurality of fourth coupling protrusions (not illustrated) are disposed to be spaced apart from one another at predetermined intervals. Accordingly, between the two adjacent fourth coupling protrusions (not illustrated), a fourth coupling groove (not illustrated) is formed.

When the second detachable module 300 and the third detachable module 400 are coupled to each other, the fourth coupling protrusion (not illustrated) of the third detachable module 400 is inserted into the third coupling groove (not illustrated) of the second detachable module 300, and the third coupling protrusion (not illustrated) of the second detachable module 300 is inserted into the fourth coupling groove (not illustrated) of the third detachable module 400.

Meanwhile, on the second side surface of the third detachable module 400, a plurality of fifth coupling protrusions (not illustrated) configured to guide the coupling to another detachable module and to temporarily fix the other detachable module and the third detachable module 400 before the bonding process may be further formed. The plurality of fifth coupling protrusions (not illustrated) are formed on the second side surface that is coupled to the other detachable module among side surfaces of the third detachable module 400. The plurality of fifth coupling protrusions (not illustrated) are disposed to be spaced apart from one another at predetermined intervals. Accordingly, between the two adjacent fifth coupling protrusions (not illustrated), a fifth coupling groove (not illustrated) is formed. Here, the second side surface of the third detachable module 400 is a side surface that faces the first side surface.

On the surfaces of the first detachable module 200 to the third detachable module 400, a metal layer is formed. As an example, the metal layer is formed, through a plating process, on the surfaces of the first detachable module 200 to the third detachable module 400. In this case, the metal layer may be formed by separately plating the first detachable module 200 to the third detachable module 400 in a state where the first detachable module 200 to the third detachable module 400 are separated from one another, or by performing the plating after the first detachable module 200 to the third detachable module 400 are coupled to one another.

As described above, the radar antenna 100 according to an embodiment of the present disclosure is constituted by coupling (bonding) the first detachable module 200 to the third detachable module 400. Since the radar antenna is not constituted as a unitized antenna, but is constituted by boding the separated modules, only the defective or faulty detachable module can be replaced, and thus the manufacturing yield can be improved, and the optimum performance can always be implemented.

Further, since the radar antenna 100 can be manufactured by preparing detachable modules having a different number of antennas, different shapes, and different sizes and combining the detachable modules in accordance with the demanded communication performance (specification), and thus the beam tilting or beam width of the radar antenna 100 can be produced to suit their purposes.

Meanwhile, the radar antenna 100 according to an embodiment of the present disclosure may be constituted as a radar antenna for reception.

Referring to FIGS. 9 and 10, the radar antenna 500 is a radar antenna 500 for reception, which receives signals transmitted from the radar antenna for transmission, and may be composed of a first detachable module 510 to a sixth detachable module 560.

On the first detachable module 510 to the sixth detachable module 560, a plurality of slits 570 constituting the antenna for reception and shield blocks 580 for shielding groups of the slits 570 constituted by the plurality of slits 570 are formed.

The first detachable module 510 is bonded onto the first side surface of the second detachable module 520, and the first side surface of the third detachable module 530 is bonded onto the second side surface of the second detachable module 520. The first side surface of the fourth detachable module 540 is bonded onto the second side surface of the third detachable module 530, and the first side surface of the fifth detachable module 550 is bonded onto the second side surface of the fourth detachable module 540. The sixth detachable module 560 is bonded onto the second side surface of the fifth detachable module 550. Through this, the radar antenna 500 is constituted as the antenna for reception having a plurality of antennas shielded through the shield blocks 580.

In this case, on the side surfaces of the first detachable module 510 to the sixth detachable module 560, a plurality of coupling protrusions configured to temporarily fix the detachable modules while guiding the coupling to another detachable module may be formed. In this case, the plurality of coupling protrusions are spaced apart from one another, and a coupling groove is formed between the two adjacent coupling protrusions.

As described above, although a preferred embodiment according to the present disclosure has been described, it is understood that various modifications are possible, and those of ordinary skill in the corresponding technical field can make various modifications and correction examples without deviating from the scope of the claims of the present disclosure.

The invention claimed is:

1. A radar antenna comprising:

a first detachable module formed with one or more antennas; and a second detachable module formed with one or more antennas, and having a first side surface bonded onto a first side surface of the first detachable module, wherein each of the one or more antennas comprises a plurality of slit groups formed on a first surface of each of the first and second detachable modules, a plurality of slits formed on a second surface of each of the first and second detachable modules, and waveguides disposed inside each of the first and second detachable modules to interconnect the plurality of slit groups and the plurality of the slits, wherein a shield block is formed on a portion of the first surface of each of the first and second detachable modules;

the shield block comprises a plurality of accommodation holes, each configured to accommodate a corresponding slit group formed of a plurality of slits;

a shield space is defined by an inner wall of each accommodation hole and the first surface of the respective detachable module; and each slit group is accommodated in the shield space so as to be shielded from an adjacent slit group.

2. The radar antenna of claim 1, wherein a plurality of first coupling protrusions are disposed to be spaced apart from one another on the first side surface of the first detachable module.

3. The radar antenna of claim 2, wherein a first coupling groove is formed between the two adjacent ones of the first coupling protrusions.

4. The radar antenna of claim 1, wherein first coupling protrusions and first coupling grooves are alternately disposed on the first side surface of the first detachable module.

5. The radar antenna of claim 3, wherein a plurality of second coupling protrusions are disposed to be spaced apart from one another on the first side surface of the second detachable module.

6. The radar antenna of claim 5, wherein a second coupling groove is formed between two adjacent ones of the second coupling protrusions.

7. The radar antenna of claim 6, wherein each of the second coupling protrusions is inserted into the first coupling groove of the first detachable module, and each of the first coupling protrusions of the first detachable module is inserted into the second coupling groove.

8. The radar antenna of claim 1, wherein the first detachable module and the second detachable module are disposed on the same plane.

* * * * *